(12) United States Patent
Venkitakrishnan et al.

(10) Patent No.: US 6,378,029 B1
(45) Date of Patent: Apr. 23, 2002

(54) SCALABLE SYSTEM CONTROL UNIT FOR DISTRIBUTED SHARED MEMORY MULTI-PROCESSOR SYSTEMS

(75) Inventors: Padmanabha I. Venkitakrishnan; Gopalakrishnan Janakiraman, both of Sunnyvale; Tsen-Gong Jim Hsu, Cupertino; Rajendra Kumar, Sunnyvale, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/295,668

(22) Filed: Apr. 21, 1999

(51) Int. Cl.[7] ............................................... G06F 13/00
(52) U.S. Cl. ...................................... 710/317; 711/148
(58) Field of Search ............................... 710/126–132, 710/305, 316–317; 711/147–148

(56) References Cited

U.S. PATENT DOCUMENTS

| | | | |
|---|---|---|---|
| 4,379,326 A | 4/1983 | Anastas et al. ............. 364/200 |
| 4,965,793 A | 10/1990 | Polzin et al. ............... 370/94.1 |
| 4,968,977 A | 11/1990 | Chinnaswamy et al. . 340/825.8 |
| 5,107,493 A | 4/1992 | Eng et al. ................... 370/94.1 |
| 5,179,669 A | 1/1993 | Peters ......................... 395/325 |
| 5,191,578 A | 3/1993 | Lee ............................... 370/63 |
| 5,261,059 A | 11/1993 | Hedberg et al. ............. 395/325 |
| 5,280,474 A | 1/1994 | Nickolls et al. ............... 370/60 |
| 5,386,511 A | 1/1995 | Murata et al. ............... 395/200 |
| 5,471,592 A | 11/1995 | Gove et al. ............ 395/300.03 |
| 5,513,371 A | 4/1996 | Cypher et al. ............... 395/800 |
| 5,522,083 A | 5/1996 | Gove et al. .................. 395/800 |
| 5,555,543 A | 9/1996 | Grohoski et al. .......... 370/58.1 |
| 5,598,408 A | 1/1997 | Nickolls et al. ............. 370/351 |
| 5,598,568 A | 1/1997 | Frisch ......................... 395/800 |
| 5,931,938 A * | 8/1999 | Drogichen et al. ............ 712/15 |

FOREIGN PATENT DOCUMENTS

| | | | |
|---|---|---|---|
| EP | 0551188 A2 | 1/1993 | ............ G06F/15/16 |
| GB | 2262173 | 6/1993 | ............ G06F/11/20 |
| GB | 2262174 | 6/1993 | ............ G06F/11/20 |
| GB | 2262175 | 6/1993 | ............ G06F/11/20 |

* cited by examiner

Primary Examiner—Sumati Lefkowitz

(57) ABSTRACT

A distributed shared memory multi-processor system includes a System Control Unit (SCU) which is made up of a system control unit address section (SCUA) and system control unit data sections (SCUDs). The SCU is scalable by dividing the control and data flow functions of the SCU, and then parallelizing the data path. This allows the number of processors in the system to be increased or higher performance processors to be added by increasing the number of SCUDs and reprogramming crossbar switches incorporated in the SCUA and SCUDs. This results in the overall increase of the multi-processor system performance.

20 Claims, 4 Drawing Sheets

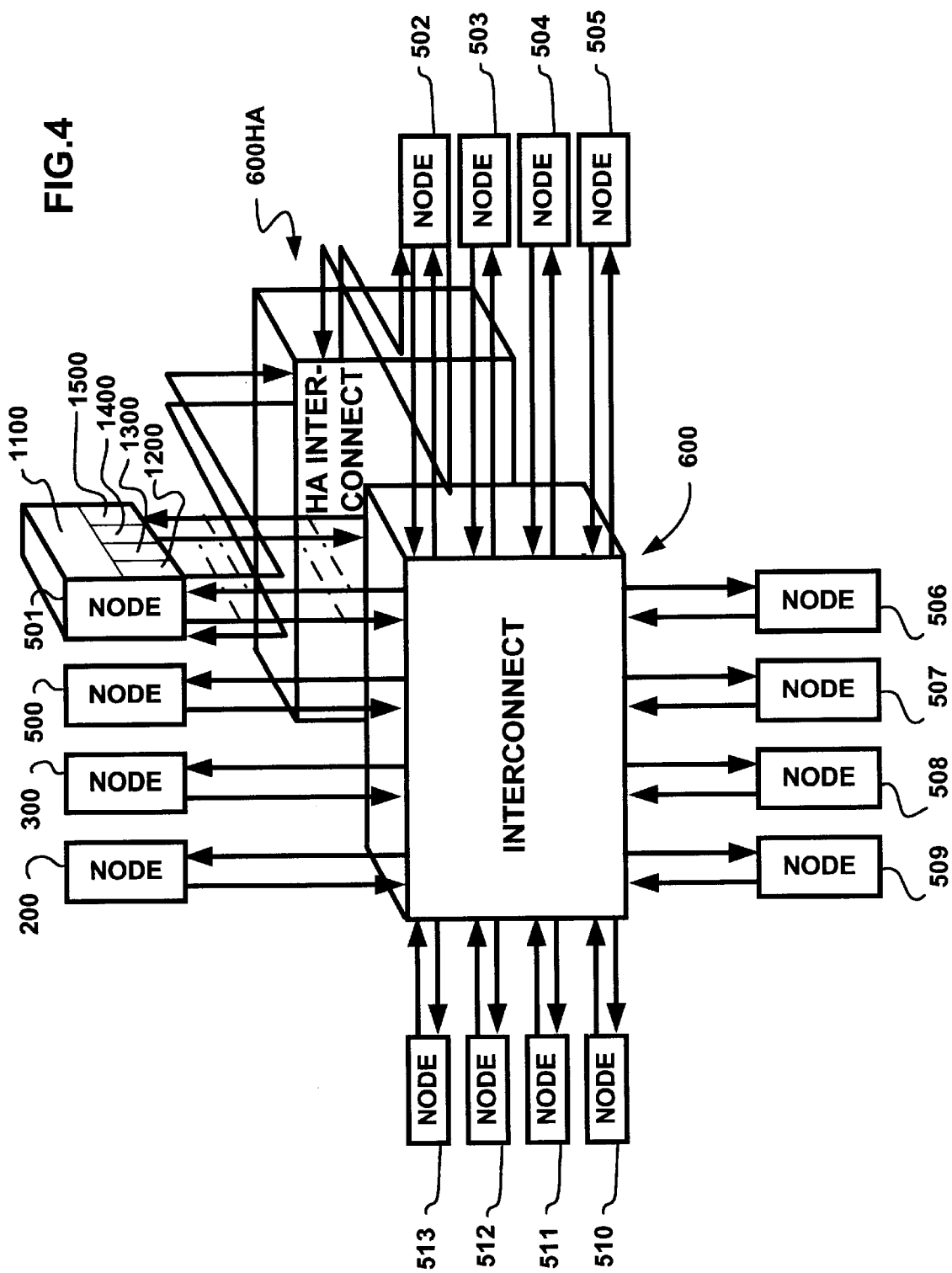

SCALABLE SYSTEM CONTROL UNIT FOR DISTRIBUTED SHARED MEMORY MULTI-PROCESSOR SYSTEMS

CROSS-REFERENCE TO RELATED APPLICATIONS

The present application contains subject matter related to a concurrently filed U.S. patent application by Padmanabha I. Venkitakrishnan entitled "Scalable, Re-Configurable Crossbar Switch Architecture for Multi-Processor System Interconnection Networks". The related application is also assigned to Hewlett-Packard Company, is identified by Ser. No. 09/296,045, and is hereby incorporated by reference.

The present application also contains subject matter related to a concurrently filed U.S. patent application by Padmanabha I. Venkitakrishnan entitled "Backup Redundant Routing System Crossbar Switch Architecture for Multi-Processor System Interconnection Networks". The related application is also assigned to Hewlett-Packard Company, is identified by Ser. No. 09/296,038, and is hereby incorporated by reference.

TECHNICAL FIELD

The present invention relates generally to multi-processor computer systems and more particularly to system control units.

BACKGROUND ART

High performance, multi-processor systems with a large number of microprocessors are built by interconnecting a number of node structures, each node containing a subset of the processors and memory in the system. While the memory in the system is distributed, several of these systems support a shared memory abstraction where all the memory in the system appears as a large memory common to all processors in the system. To support high-performance, these systems typically allow processors to maintain copies of memory data in their local caches. Since multiple processors can cache the same data, these systems must incorporate a cache coherence mechanism to keep the copies coherent.

In some cache-coherent systems, each line of memory (typically a portion of memory tens of bytes in size) is assigned a home node, which manages the sharing of that memory line, and guarantees its coherence. The home node maintains a directory, which identifies the nodes that possess a copy of the memory line. When a node requires a copy of the memory line, it requests the memory line from the home node. The home node supplies the data from memory if memory has the latest data. If another node has the latest copy of the data, the home node directs this node to forward the data to the requesting node. The home node employs a coherence protocol to ensure that when a node writes a new value to the memory line, all other nodes see this latest value. Coherence controllers implement this coherence functionality. First, they implement a coherence controller for each memory unit, which maintains coherence of all memory lines in that memory unit. Second, the functionality of the coherence controller is integrated with the functionality of the System Control Unit (SCU) of the associated node.

The SCU provides the control and the path for data movement for the following sources and destinations within the node:

(a) the microprocessors within the node;

(b) the local (node) portion of the memory system;

(c) the network connecting all of the nodes of the multi-processor system; and (d) the input/output (I/O) system of the local node.

The above requires an interconnection network that is efficient in carrying control information and data.

The SCU includes logic for determining a desired destination from a message header, and for appropriately routing all of the parallel bits of a transmission; e.g., 64 bits in parallel for a 64 bit processor. However, this presents inherent scalability problems. For example, a typical SCU might service four processors in parallel, and route 64 bits to one of the four processors; such a system could not readily be reconfigured to handle 128 bits in parallel to support higher-performance systems. Further, such a solution would be at the edge of integrated circuit and system packaging technologies.

In addition, current bus-based DSM multi-processor systems require passage of signals through the interconnection network crossbar switches and it is desirable to find a better way of providing point-to-point communication links between the SCU, the processors within a node, and the local memory section.

Thus, a method or architecture has been long sought and long eluded those skilled in the art, which would be scalable and re-configurable while having low latency.

DISCLOSURE OF THE INVENTION

The present invention provides a distributed shared memory multi-processor system which includes a System Control Unit (SCU) made up of a system control unit address section (SCUA) and system control unit data sections (SCUDs). The SCU is scalable by dividing the control and data flow functions of the SCU, and then parallelizing the data path. This allows the number of processors in the system to be increased or higher performance processors to be added by increasing the number of SCUDs and reprogramming crossbar switches incorporated in the SCUA and SCUDs. This enables implementation of the SCU function without pushing the limits of integrated circuit and system packaging technologies.

The present invention also provides point-to-point communication links among the SCU, the processors within the node, and the local memory section of the DSM multi-processor system via control and data crossbar switches contained within the SCU.

The present invention further provides a point-to-point, non-blocking communication link between nodes which significantly improves the overall system performance of the DSM multi-processor system over similar prior art bus based systems.

The present invention still further provides a SCU with easily added multiple signal ports for connection to the interconnection network which enhances the reliability and high-availability of the multi-processor system.

The above and additional advantages of the present invention will become apparent to those skilled in the art from a reading of the following detailed description when taken in conjunction with the accompanying drawings.

BRIEF DESCRIPTION OF THE DRAWINGS

FIG. 4 is a functional block diagram of a high availability (HA) DSM multi-processor system according to the present invention.

BEST MODE FOR CARRYING OUT THE INVENTION

Figure 1:
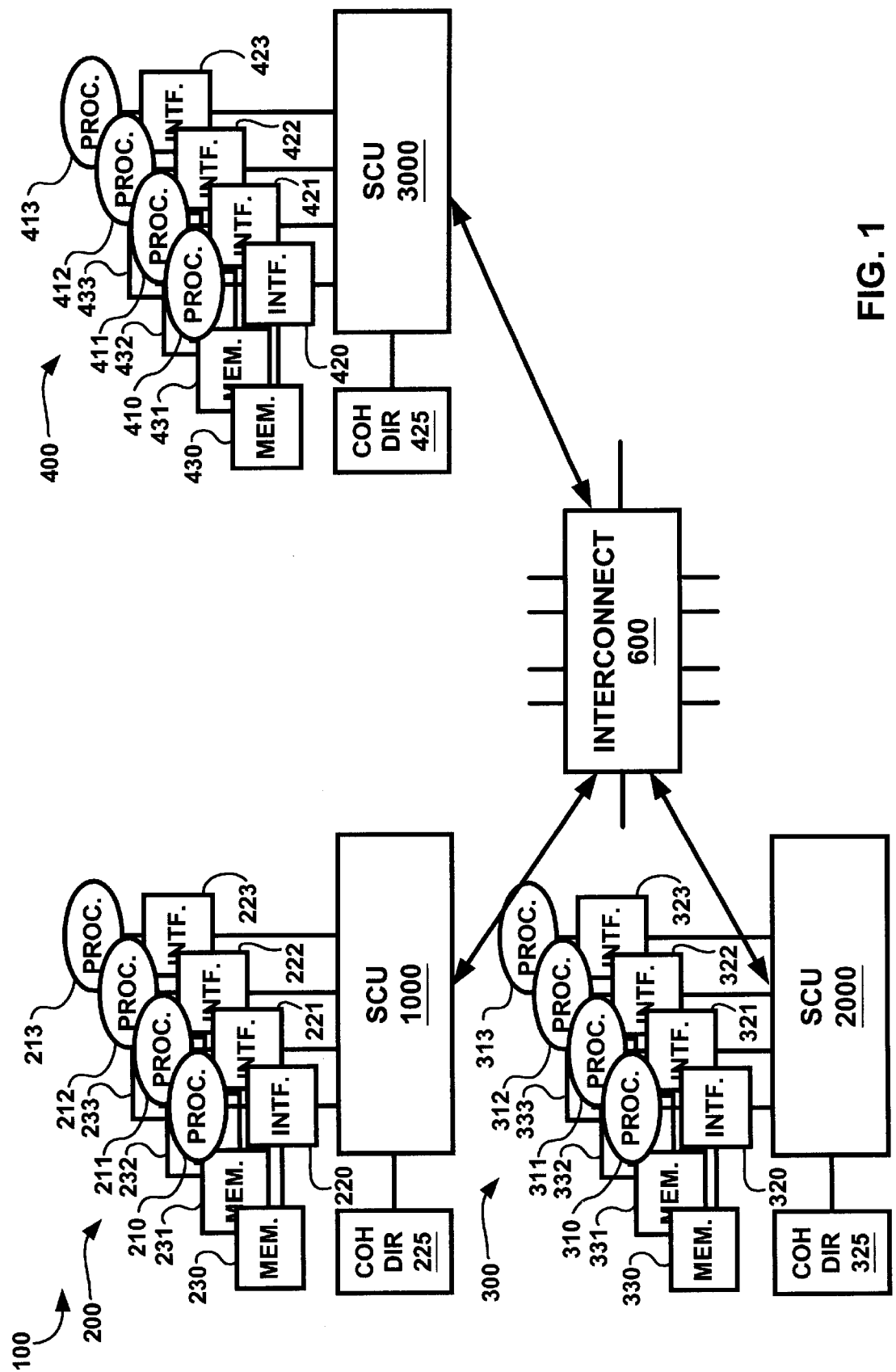
FIG. 1 is a Distributed Shared Memory (DSM) multi-processor system according to the present invention.

Referring now to FIG. 1, therein is shown a Distributed Shared Memory (DSM) multi-processor system 100. The multi-processor system 100 has a plurality of nodes 200, 300, and 400. The nodes 200, 300, and 400 are connected to an interconnection network cross bar switch, or interconnect 600. Each of the nodes 200, 300, and 400 contains a plurality of microprocessors, or processors. The node 200 contains processors 210 through 213, the node 300 contains processors 310 through 313, and the node 400 contains processors 410 through 413.

The processors 210 through 213 are respectively connected to interface units 220 through 223 to which are respectively connected local (node) memory units 230 through 233. Similarly, the processors 310 through 313 are respectively connected to interface units 320 through 323 and respectively to memory units 330 through 333. And further, the processors 410 through 413 are respectively connected to the interface units 420 through 432, which are further respectively connected to the memory units 430 through 433.

The interface units 220 through 223 in the node 200 are connected to a system control unit (SCU) 1000. The interface units 320 through 323 are connected to an SCU 2000. And, the interface units 420 through 423 are connected to an SCU 3000.

In the DSM multi-processor system 100, each line of memory (typically a block of memory tens of bytes in size) is assigned to a "home node", such as the node 200 which maintains the sharing of that memory line and guarantees its coherence. The home node maintains a directory which identifies the nodes that possess a copy of that memory line. In the nodes 200, 300, and 400, the coherence directories 225, 325, and 425 are respectively connected to the SCU 1000, 2000, and 3000. When a node requires a copy of a memory line, it requests the memory line from the home node. The home node supplies the data from its memory unit if it has the latest data. If another node has the latest data, the home node directs this node to forward the data to the requesting node. The home node employs a coherence protocol to assure that when a node writes a new value to the memory line, all other nodes see this latest value. The coherence controllers, which are a part of the SCU 1000, 2000, and 3000, implement this coherence functionality.

Figure 2:
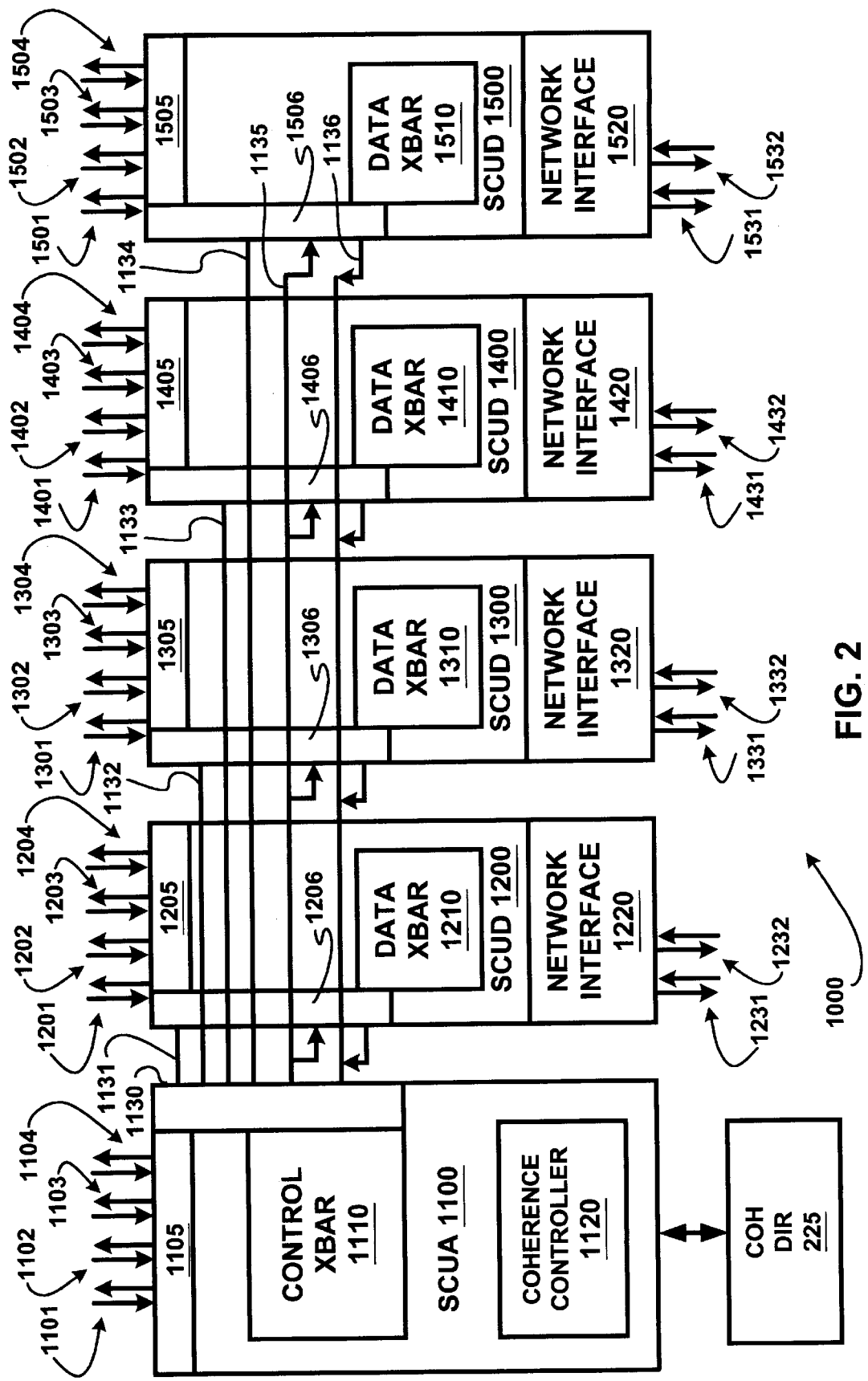
FIG. 2 is a functional block diagram of the System Control Unit (SCU) according to the present invention.

Referring now to FIG. 2, therein is shown a typical system control unit, SCU 1000. The SCU 1000 consists of a system control unit address section, SCUA 1100, and a plurality of system control unit data sections, such as SCUD 1200, SCUD 1300, SCUD 1400, and SCUD 1500.

The SCUA 1100 has a plurality of paired ports 1101 through 1104, which connect addresses from a processor interface 1105 to the interface units 220 through 223. The interface units 220 through 223 are respectively connected to the processors 210 through 213 and the memory units 230 through 233.

The SCUA 1100 further contains a programmable control crossbar section 1110 and a coherence controller 1120. Further, the coherence directory 225 is connected to the SCUA 1100. The control crossbar section 1110 is programmable to operatively interconnect the address signals to the processors 210 through 213. The SCUA 1100 also has a SCUD interface 1130 having a plurality of ports 1131 through 1137. The plurality of ports 1131 through 1134, respectively, connect to the SCUDs 1200, 1300, 1400, and 1500. The port 1135 outputs from and port 1136 inputs to the SCUA 1100 from each of the SCUDs 1200, 1300, 1400, and 1500.

The SCUD 1200 has a plurality of paired ports 1201 through 1204 which connect data from a processor interface 1205 to the interface units 220 through 223. The interface units 220 through 223 are respectively connected to the respective processors 210 through 213 and the respective memory units 230 through 233. The SCUD 1200 further has an SCUA interface 1206 which receives signals from the SCUD interface 1130 on the SCUA 1100 from port 1135 while sending signals to the port 1136.

The SCUD 1200 further contains a programmable data crossbar switch 1210 which is connected to a network interface 1220. The network interface 1220 has a plurality of paired ports 1231 and 1232. The paired ports 1231 connect the SCUD 1200 to the crossbar switch 600. The paired ports 1232 are used for the high availability system, which will be described later.

The SCUD 1300 has a plurality of paired ports 1301 through 1304 which connect data from a processor interface unit 1305 to the interface units 220 through 223. The interface units 220 through 223 are respectively connected to the respective processors 210 through 213 and the respective memory units 230 through 233. The SCUD 1300 further has an SCUA interface 1306 which receives signals from the SCUD interface 1130 on the SCUA 1100 from port 1135 while sending signals to the port 1136.

The SCUD 1300 further contains a programmable data crossbar switch 1310 which is connected to a network interface 1320. The network interface 1320 has a plurality of paired ports 1331 through 1334. The paired ports 1231 connect the SCUD 1200 to the crossbar switch 600. The paired port 1232 are used for the high availability system, which will be described later.

The SCUD 1400 has a plurality of paired ports 1401 through 1404 which connect data from a processor interface 1405 to the interface units 220 through 223. The interface units 220 through 223 are respectively connected to the respective processors 210 through 213 and the respective memory units 230 through 233. The SCUD 1400 further has an SCUA interface 1406 which receives signals from the SCUD interface 1130 on the SCUA 1100 from port 1135 while sending signals to the port 1136.

The SCUD 1400 further contains a programmable data crossbar switch 1410 which is connected to a network interface 1420. The network interface 1420 has a plurality of paired ports 1431 and 1432. The paired port 1431 connects the SCUD 1200 to the crossbar switch 600. The paired port 1232 is used for the high availability system, which will be described later.

The SCUD 1500 has a plurality of paired ports 1501 through 1504 which connect data from a processor interface 1505 to the interface units 220 through 223. The interface units 220 through 223 are respectively connected to the respective processors 210 through 213 and the respective memory units 230 through 233. The SCUD 1500 further has an SCUA interface 1506 which receives signals from the SCUD interface 1130 on the SCUA 1100 from port 1135 while sending signals to the port 1136.

The SCUD 1500 further contains a programmable data crossbar switch 1510 which is connected to a network interface 1520. The network interface 1520 has a plurality of paired ports 1531 and 1532. The paired ports 1531 connect the SCUD 1200 to the crossbar switch 600. The paired ports 1532 are used for the high availability system, which will be described later.

Figure 3:
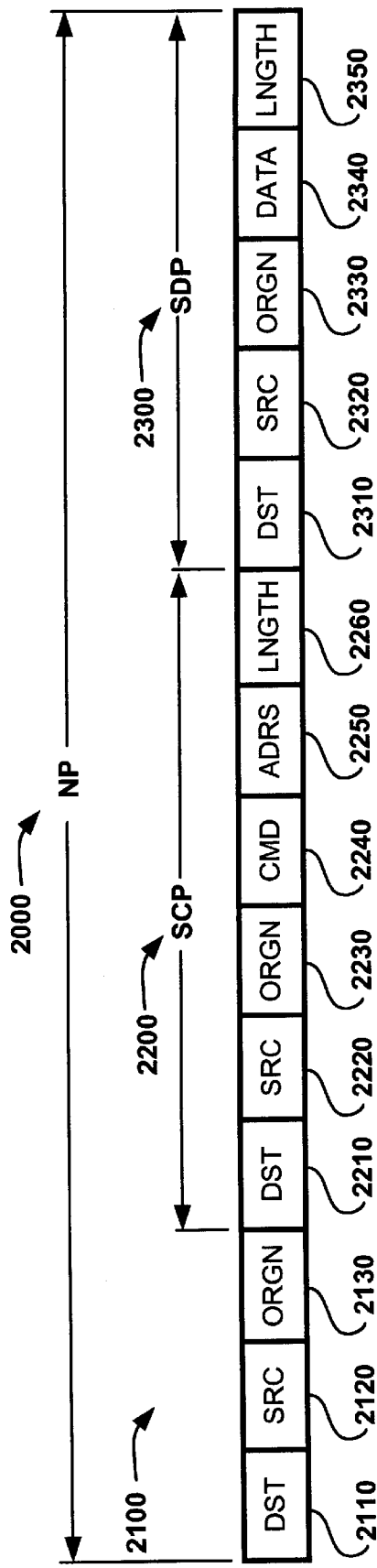
FIG. 3 is an illustration of the SCU network packet formats according to the present invention.

Referring now to FIG. 3, therein is a shown an illustration of the system control unit packet format according to the present invention. The control and data signal transversals through the node between its source and destination processors are accomplished by the network packet (NP) 2000. The NP 2000 is configured to provide routing information 2100, system control unit control packet (SCP) information 2200, and system control unit data packet (SDP) information 2300.

The routing information 2100 includes the following information: destination 2110, source 2120, and originator 2130.

The SCP information 2200 contains the following information: destination 2210, source 2220, originator 2230, the command 2240, the address 2250, and the length 2260.

The SDP information 2300 contains the following information: destination 2310, source 2320, originator 2340, the data 2340, and its length 2350.

In operation, the multi-processor system 100 increases overall system performance by providing point to point connection links between the processors, for example between the processor 210 and the processor 213 to the SCU 1000 without having to go to the interconnect 600.

Similarly, the processors within the node 200 can access the local (node) memory units 230 through 233 through the SCU 1000 without going to the interconnect 600.

Thus, by providing point to point connections through the SCU 1000 rather than through prior art buses, the latency of the system is greatly reduced and hence overall system performance is improved.

The multi-processor system 100 partitions the control and data flow functions of the SCU. The control and data signal transversals through the SCU between its sources and destinations is accomplished by moving two types of signal packets having the format shown in FIG. 3. Because the NP 2000 includes the SCP 2200 and the SDP 2300, the SCU function can be split into two. The SCUA provides the address and control functions and SCUD provides the data functions.

In order to provide the point to point communication links among the SCU, the local processors, and the local memory units, the SCUA and the SCUDs contain one crossbar switch each, as shown in FIG. 2. The SCUA 1100 contains the control crossbar switch 1110 while the SCUDs 1200, 1300, 1400, and 1500 respectively contain the data crossbar switches 1210, 1310, 1410, and 1510. These crossbar switches route the SCP 2200 and the SDP 2300 between the sources and destinations of the SCU 1000. The crossbar switches not only provide much lower control and data traversal latencies between any two processors in a given node, but also is programmable to facilitate widening the data path by parallelizing which in turn provides data bandwidth far greater than available with prior art systems as will hereinafter be explained.

The SCUA 1100 performs almost all of the control part of the SCU function. This includes the cache coherency function for the local memory by virtue of the coherence controller 1120. The processor interface 1105 in the SCUA 1100 also decodes and interprets the addresses and commands from the processors 210 through 213 via the paired ports 1101 through 1104, respectively. Similarly, the processor interface 1105 helps to set up the routing of the control crossbar switch 1110. Through the SCUD interface 1130, the SCUA 1100 sets the routing of the data crossbar switches 1210, 1310, 1410, and 1510 in the SCUDs 1200, 1300, 1400, and 1500, respectively.

The SCUDs 1200, 1300, 1400, and 1500 contain processor interfaces 1205, 1305, 1305 and 1505, respectively, to communicate with the processors in the local node. The SCUDs 1200, 1300, 1400, and 1500 in addition to routing data among the processors and memory units contain network interfaces 1220, 1320, 1420, and 1520, respectively, which are interface logic to the interconnect 600 and the rest of the multi-processor system 100. The information to and from the multi-processor system 100 network is in the form of the network packet 2000.

In order to meet the bandwidth requirements of a high-performance, multi-processor system 100, the data path width should be easily scalable. The SCUDs in the present invention provide an ideal way to make the system scalable. A low and medium performance multi-processor system could conceivably have one SCUA 1100 and just one or two SCUDs 1200 or 1200 and 1300. A high-performance system such as the multi-processor system 100 could have one SCUA and four or more SCUDs. The SCUDs in all these systems can be one integrated circuit or a plurality of integrated circuits.

Furthermore, by splitting and building the SCU functions with one SCUA and many bit-sliced SCUD integrated circuits, this helps in implementing these circuits without pushing integrated circuit and part packaging limits. The single SCUA along with the scalable, bit-sliced, SCUDs facilitate the increase or decrease of the bandwidth of a node by adding or removing an appropriate number of SCUDs and then appropriately programming the SCUA to properly control the SCUDs.

In order to enhance the reliability and high availability of the multi-processor system 100, redundant system interconnection networks can be built in parallel with the primary system interconnection network.

Referring now to FIG. 4, therein is shown a functional block diagram of the DSM computer system 1000 with the interconnect 600 backed up by a secondary interconnect 600HA for high availability (HA) applications where continued operation in the event of a crossbar switch failure is essential. The interconnect 600HA would be connected in parallel to the paired ports 1232, 1332, 1432, and 1532, respectively, of the SCUDs 1200, 1300, 1400, and 1500.

The above system uses one set of paired ports in the system control unit data (SCUD) for the primary network and the other set for the redundant network. This allows the interconnect 600HA to take over in the event of a failure of a portion or the entire interconnect 600.

Also shown in FIG. 4 is a high performance, high availability system showing processor nodes 200 and 300, but also processor nodes 500 through 513 which could be connected to interconnect 600 and 600HA (note that most of the connections have been eliminated in the figure in the interests of simplicity).

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A multi-processor system comprising:
a plurality of processors;
a system control unit operatively connected to said plurality of processors and containing:
 a system control unit address section containing a programmable control crossbar switch responsive to address information provided thereto for selectively interconnecting said plurality of processors, and
 a system control unit data section containing a programmable data crossbar switch responsive to data provided thereto for selectively providing data to said plurality of processors interconnected by said system control unit address section.

2. The multi-processor system as claimed in claim 1 including:
a second control unit data section connected to said system control unit address section and to said plurality of processors,
said second control unit data section connected in parallel with said system control unit data section to communicate in at least two parallel bites of data and wherein one of said control unit data sections routes one of said bits and another of said control unit data sections routes another of said bits.

3. The multi-processor system as claimed in claim 1 wherein said system control unit address section and said control unit data section communicate with signal packets and said signal packets program said programmable control and said data crossbar switches.

4. The multi-processor system as claimed in claim 1 wherein:
said plurality of processors communicate in a plurality of bits; and
said system control unit contains a plurality of system control unit data sections, and each of said plurality of system control unit data sections communicates one of said plurality of bits.

5. The multi-processor system as claimed in claim 1 wherein said system control unit includes a coherence controller.

6. The multi-processor system as claimed in claim 1 including:
a plurality of interface units connecting said plurality of processors to said system control unit; and
a plurality of memory units connected to said plurality of interface units whereby each of said memory units is connected to one of said plurality of processors.

7. The multi-processor system as claimed in claim 1 including:
a plurality of system control units operatively connected to said plurality of processors;
a programmable crossbar switch connected to said system control unit for selectively connecting said system control unit to said plurality of system control units whereby said plurality of processors can be interconnected.

8. The multi-processor system as claimed in claim 1 including:
a programmable crossbar switch connected to said system control unit for selectively connecting said system control unit to said plurality of system control units whereby said plurality of processors can be interconnected; and
a high availability programmable crossbar switch connected in parallel, with said programmable crossbar switch, to said system control unit for selectively connecting said system control unit to said plurality of system control units whereby said high availability programmable crossbar switch operates when said programmable crossbar switch fails.

9. The multi-processor system as claimed in claim 1 wherein each of said plurality of system control unit data sections is an individual integrated circuit.

10. The multi-processor system as claimed in claim 1 wherein said system control unit is programmable between a parallelized mode and a processor connection mode.

11. A multi-processor system comprising:
a plurality of processors;
a plurality of interface units, each of said plurality of interface units connected to one of said plurality of processors;
a plurality of memory units, each of said plurality of memory units connected to one of said plurality of interface units
a system control unit connected to said plurality of interface units and containing:
 a system control unit address section containing a programmable control crossbar switch responsive to address information provided thereto for selectively interconnecting said plurality of processors, and
 a system control unit data section containing a programmable data crossbar switch responsive to data provided thereto for selectively providing data to said plurality of processors interconnected by said system control unit address section.

12. The multi-processor system as claimed in claim 11 including:
a second control unit data section connected to said system control unit address section and to said plurality of interface units, and
said second control unit data section connected in parallel with said system control unit data section to communicate in at least two parallel bites of data and wherein one of said control unit data sections routes one of said bits and another of said control unit data sections routes another of said bits among said plurality of processors and memory units.

13. The multi-processor system as claimed in claim 11 wherein said system control unit address section and said control unit data section communicate with signal packets and said signal packets program said programmable control and said data crossbar switches.

14. The multi-processor system as claimed in claim 11 wherein:
said plurality of processors communicate in a plurality of bits; and
said system control unit contains a plurality of system control unit data sections, and each of said plurality of system control unit data sections communicates one of said plurality of bits.

15. The multi-processor system as claimed in claim 11 wherein said system control unit includes a coherence controller for maintaining memory coherence for said memory units.

16. The multi-processor system as claimed in claim 11 wherein:
said system control unit interconnects said plurality of processors with said plurality of memory units.

17. The multi-processor system as claimed in claim 11 including:
a plurality of system control units connected to said plurality of interface units;

a programmable crossbar switch connected to said system control unit for selectively connecting said system control unit to said plurality of system control units whereby said plurality of processors can be interconnected.

18. The multi-processor system as claimed in claim 11 including:

a plurality of system control units connected to said plurality of interface units;

a programmable crossbar switch connected to said system control unit for selectively connecting said system control unit to said plurality of system control units whereby said plurality of processors can be interconnected; and a high availability programmable crossbar switch connected in parallel, with said programmable crossbar switch, to said system control unit for selectively connecting said system control unit to said plurality of system control units whereby said high availability programmable crossbar switch operates when said programmable crossbar switch fails.

19. The multi-processor system as claimed in claim 11 wherein each of said plurality of system control unit data sections is an individual integrated circuit.

20. The multi-processor system as claimed in claim 11 wherein said system control unit is programmable between a parallelized mode and a processor connection mode.

* * * * *